US012366403B2

(12) United States Patent
Jin

(10) Patent No.: US 12,366,403 B2
(45) Date of Patent: Jul. 22, 2025

(54) REFRIGERATOR

(71) Applicant: LG ELECTRONICS INC., Seoul (KR)

(72) Inventor: Dongchul Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/645,491

(22) Filed: Apr. 25, 2024

(65) Prior Publication Data

US 2024/0271857 A1 Aug. 15, 2024

Related U.S. Application Data

(63) Continuation of application No. 17/550,275, filed on Dec. 14, 2021, now Pat. No. 12,000,644.

(30) Foreign Application Priority Data

Jan. 11, 2021 (KR) ........................ 10-2021-0003647

(51) Int. Cl.
*F25D 23/02* (2006.01)
*H05B 3/84* (2006.01)

(52) U.S. Cl.
CPC ................ *F25D 23/02* (2013.01); *H05B 3/84* (2013.01)

(58) Field of Classification Search
CPC ...... F25D 23/02; F25D 21/04; F25D 2201/12; F25D 23/028; F25D 2323/02; F25D 23/064; F25D 23/087; F25D 2201/126
See application file for complete search history.

(56) References Cited

U.S. PATENT DOCUMENTS 3,411,247 A * 11/1968 Fleming .............. E06B 3/26347 52/786.13
4,998,382 A * 3/1991 Kostos .................. E06B 3/6617 49/504
5,910,083 A * 6/1999 Richardson ........... A47F 3/0434 52/656.1
7,043,886 B1 * 5/2006 Chubb .................. F25D 23/028 52/204.5
10,295,249 B2 * 5/2019 Park ...................... F25D 27/005
10,342,363 B2 * 7/2019 Park ...................... F25D 23/028
10,704,826 B2 * 7/2020 Lee ....................... A47F 3/0434
11,073,328 B1 * 7/2021 Akalan ................. F25D 23/062
11,609,038 B2 * 3/2023 Kim ........................ D06F 39/14
11,624,549 B2 * 4/2023 Kim ........................ F25D 23/02 312/405
11,885,553 B2 * 1/2024 Bae ....................... F25D 23/028
(Continued)

FOREIGN PATENT DOCUMENTS

JP 3657341 B2 * 6/2005
WO WO-2020096258 A1 * 5/2020 ............. D06F 39/14

*Primary Examiner* — Hanh V Tran
(74) *Attorney, Agent, or Firm* — Fish & Richardson P.C.

(57) ABSTRACT

A refrigerator includes a cabinet and a door. The door includes a panel assembly, a door frame, a door liner, and an insulator provided in a space defined by the panel assembly and the door frame. The panel assembly includes a front panel and a rear panel. The door further includes a rod that connects the front panel to the rear panel, a heater housing that covers the rod and is attached to a rear surface of the front panel, and a heating device coupled to the heater housing and in contact with the rear surface of the front panel.

20 Claims, 20 Drawing Sheets

(56) References Cited

U.S. PATENT DOCUMENTS

| | | | | |
|---|---|---|---|---|
| 2008/0024047 | A1* | 1/2008 | Juo | F25D 23/02 312/236 |
| 2008/0190046 | A1* | 8/2008 | Hecht | A47F 3/0434 52/173.1 |
| 2013/0026900 | A1* | 1/2013 | Oh | E05D 7/00 312/401 |
| 2017/0211874 | A1* | 7/2017 | Kim | A47L 15/4257 |
| 2017/0299258 | A1* | 10/2017 | Gong | F25D 23/028 |
| 2018/0112906 | A1* | 4/2018 | Yi | F25D 21/04 |
| 2018/0112909 | A1* | 4/2018 | Choi | B29C 44/588 |
| 2018/0274846 | A1* | 9/2018 | Kim | F25D 27/005 |
| 2018/0274852 | A1* | 9/2018 | Kang | F25D 27/005 |
| 2019/0032994 | A1* | 1/2019 | Choi | F21V 3/00 |
| 2019/0196086 | A1* | 6/2019 | Schenkl | G02B 6/0021 |
| 2019/0257571 | A1* | 8/2019 | Park | E06B 3/70 |
| 2019/0360745 | A1* | 11/2019 | Lee | G02B 6/0065 |
| 2019/0383551 | A1* | 12/2019 | Choi | A47F 3/0434 |
| 2020/0173715 | A1* | 6/2020 | Kim | F25D 29/00 |
| 2022/0003482 | A1* | 1/2022 | Bae | F25D 1/00 |
| 2022/0128290 | A1* | 4/2022 | Jeon | F25D 23/025 |
| 2022/0408941 | A1* | 12/2022 | Hwang | F25D 23/028 |

* cited by examiner

REFRIGERATOR

CROSS REFERENCE TO RELATED APPLICATION

This application is a continuation of U.S. application Ser. No. 17/550,275, filed on Dec. 14, 2021, which claims priority to and benefit of Korean Patent Application No. 10-2021-0003647, filed on Jan. 11, 2021. The disclosure of the prior application are incorporated herein by reference in their entirety.

TECHNICAL FIELD

The present disclosure relates to a refrigerator.

BACKGROUND

A refrigerator may lose cool air therein due to frequent opening of a door. In some cases, to reduce or prevent the loss of cool air, the refrigerator may allow a user to see the inside of the refrigerator without opening the door of the refrigerator, thereby reducing the number of times of opening and closing the door of the refrigerator. For instance, a refrigerator door may include a panel assembly made of glass enabling the inside of the refrigerator to be seen, and a door frame supporting the panel assembly.

In some cases, the door frame may be made of only a metal material or a synthetic resin, and the parts may be fixed to each other by screw fastening. In some cases, in order to reduce the weight of the door to increase the convenience of using the door, the door frame of the door may be made only of synthetic resin material, not metal material. The synthetic resin door frame may be light in weight, but have weak strength compared to the metal door frame. Therefore, it may be difficult to stably support the door panel made of heavy glass.

For instance, it may be difficult to strongly fasten components of the synthetic resin door frame by a fastening device such as a bolt. In some case, a foam solution may leak through the assembly part of the part.

In some examples, the refrigerator door may be made by foaming and filling a foam solution such as polyurethane into the door for insulation performance. In some examples, where the door for a refrigerator through which the inside of the refrigerator is visible, it may be difficult to provide the foam solution because the foaming space and the foaming passage are relatively small compared to a general door for a refrigerator. In some cases, to avoid a glass portion through which the inside of the refrigerator is visible and to provide the foaming space in an outer part of the door, the foaming space and the foaming passage may be limited to a part of the door except for the see-through part. For instance, the foam space and the foaming passage may be provided in the door frame.

In some cases, it may be possible to provide a sufficient foaming space by increasing the thickness of the door frame of the door, but the see-through part through which the inside of the refrigerator is visible may be relatively reduced. In some cases, the door frame may be exposed through a see-through window to spoil aesthetic of the door. In some cases, foaming resistance may be reduced in foaming a foam solution into a temporarily assembled door. In order to secure the foaming space and the foaming passage, the door frame may be thick, and an area of the see-through window may be relatively small.

SUMMARY

The present disclosure describes a refrigerator that includes a transparent panel assembly applied to a door assembly to enable the inside of the refrigerator to be seen through, and a door frame that supports the panel assembly and includes synthetic resin components engageably assembled to each other.

The present disclosure further describes a refrigerator that includes a transparent panel assembly applied to a door of the refrigerator to enlarge an area through which the inside of the refrigerator is visible, where an entire front surface of the panel assembly can be exposed forward and have only a transparent front panel of the assembly to be seen from an outside.

According to one aspect of the subject matter described in this application, a refrigerator includes a cabinet that defines a storage chamber and a door configured to open and close at least a portion of the storage chamber. The door includes a panel assembly including a front panel and a rear panel that are connected to each other, where the front panel defines a front surface of the door, and the rear panel is spaced apart from the front panel and defines a rear surface of the door. The door further includes an upper frame that defines an upper surface of the door and is coupled to a rear surface of the front panel, a lower frame that defines a lower surface of the door and is coupled to the rear surface of the front panel, side frames that define lateral surfaces of the door, respectively, and are coupled to the rear surface of the front panel, a door liner that is in contact with the upper frame, the lower frame, the side frames, and the rear panel, and an insulator provided in a foaming space defined by the panel assembly, the upper frame, the lower frame, and the side frames. The door further includes a rod that connects the front panel to the rear panel, a heater housing that covers the rod and is attached to the rear surface of the front panel, and a heating device coupled to the heater housing, the heating device being in contact with the rear surface of the front panel.

Implementations according to this aspect can include one or more of the following features. For example, the heater housing can define a heater mounting groove that faces the rear surface of the front panel and receives the heating device, and a plurality of attachment grooves that are spaced apart from the heater mounting groove and arranged in parallel to another along the heater housing.

In some implementations, the heater housing can include a frame that has an L-shaped cross-section extending toward the rear panel, where a part of the heater housing covers a lateral side of the rear panel, and the rod is disposed adjacent to the lateral side of the rear panel.

According to another aspect, a refrigerator includes a cabinet that defines a storage chamber and a door configured to open and close at least a portion of the storage chamber. The door includes a panel assembly including a front panel and a rear panel that are connected to each other, where the front panel defines a front surface of the door, and the rear panel is spaced apart from the front panel and defines a rear surface of the door. The door further includes an upper frame that defines an upper surface of the door and is coupled to a rear surface of the front panel, a lower frame that defines a lower surface of the door and is coupled to the rear surface of the front panel, side frames that define lateral surfaces of the door, respectively, and are coupled to the rear surface of the front panel, a door liner that is in contact with the upper frame, the lower frame, the side frames, and the rear panel, and an insulator provided in a foaming space defined by the panel assembly, the upper frame, the lower frame, and the side frames. The door liner includes a center portion that defines an opening that faces the rear panel in a thickness direction of the door, a foam boundary portion that protrudes relative to the center portion and covers a periphery of the center portion, and a damping plate disposed between the foam boundary portion and the rear panel.

Implementations according to this aspect can include one or more of the following features. For example, the upper frame, the lower frame, and the side frames define a door frame, where an outer portion of the door liner can be in contact with edges of a rear surface of the door frame, and an end of the foam boundary portion can be coupled to a rear surface of the rear panel.

In some implementations, the door liner can further include a locking arm that protrudes from an upper portion of the door liner and is coupled to a lower end of an upper rear surface of the upper frame, and a locking hook disposed at a lower portion of the door liner and coupled to the lower frame, the locking hook extending forward relative to a lower rear surface of the lower frame.

In some implementations, the foam boundary portion can be in contact with a rear surface of the rear panel to thereby define a boundary of the foaming space along a contact region between the foam boundary portion and the rear surface of the rear panel. In some implementations, the foam boundary portion can define a damping space that is recessed rearward relative to the rear panel. In some examples, the damping plate can be disposed in the damping space and protrudes toward the rear panel to thereby divide the damping space.

In some implementations, the upper frame, the lower frame, and the side frames define a door frame, where an edge of the door liner is in contact with a rear surface of the door frame. The door liner can further include a division fence that protrudes from an inner surface of the door liner toward the foaming space, where the division fence is disposed adjacent to an edge of the rear surface of the door frame.

According to another aspect, a refrigerator a cabinet that defines a storage chamber and a door configured to open and close at least a portion of the storage chamber. The door includes a panel assembly comprising a front panel and a rear panel that are connected to each other, where the front panel defines a front surface of the door, and the rear panel is spaced apart from the front panel and defines a rear surface of the door. The door further includes (i) an upper frame that defines an upper surface of the door and is coupled to a rear surface of the front panel, the upper frame having an upper front surface, an upper main part, and an upper rear surface, (ii) a lower frame that defines a lower surface of the door and is coupled to the rear surface of the front panel, the lower frame having a lower front surface, a lower main part, and a lower rear surface, (iii) side frames that define lateral surfaces of the door, respectively, and are coupled to the rear surface of the front panel, each of the side frames having a side front surface, a side main portion, and a side rear surface.

The door further includes a door liner that is in contact with the upper rear surface, the lower rear surface, the side rear surfaces, and the rear panel, and an insulator provided in a foaming space defined by the panel assembly, the upper frame, the lower frame, and the side frames. At least one of the upper front surface or the lower front surface defines a stepped assembly surface that is recessed relative to the front surface of the door, where the side front surface is in contact with the stepped assembly surface such that the upper front surface or the lower front surface defines a plane parallel to the side front surface.

Implementations according to this aspect can include one or more of the following features. For example, each of the upper front surface and the lower front surface can define the stepped assembly surface, where the side frames are coupled to the stepped assembly surfaces, respectively, and define a common plane with the upper frame and the lower frame. In some examples, the side frames can include one of a locking hole or a first locking hook, and the upper frame can include the other of the locking hole or the first locking hook, where the first locking hook is coupled to the locking hole.

In some implementations, a cross-section of each of the side frames, the upper frame, and the lower frame has a U-shape. The side frames and the upper frame can be perpendicularly arranged and coupled to each other, where each of the side frames has at least three surfaces in contact with the upper frame. The side frames and the lower frame can be perpendicularly arranged and coupled to each other, where each of the side frames has at least three surfaces in contact with the lower frame.

In some implementations, the upper frame and the side frames can be assembled to each other along an assembly direction, and where each of the upper front surface and the upper rear surface can include a first locking hook that is inclined downward along the assembly direction. In some implementations, the upper frame can define a sensor mounting part that receives a door sensor, and the upper frame can include transfer ribs that are connected to a portion between the sensor mounting part and the upper front surface.

In some implementations, the upper frame can include a reinforcement rib that connects inner sides of the upper front surface, the upper main part, and the upper rear surface to one another, where the inner sides face the foaming space. In some examples, the upper main part of the upper frame can include a stepped surface that defines an inlet through which the insulator is provided into the foaming space, and a shield cover that covers the inlet. The shield cover can include (i) a cover body that is disposed at the stepped surface of the upper main part and (ii) a cover hook that is disposed at a lower portion of the cover body and coupled to a lower surface of the inlet.

In some implementations, the side front surface of each of the side frames and a rear surface of the front panel can define a first attachment surface. The upper front surface of the upper frame and the rear surface of the front panel can define a second attachment surface. The lower front surface of the lower frame and the rear surface of the front panel can define a third attachment surface, where the first attachment surface, the second attachment surface, and the third attachment surface define a continuous surface together.

In some implementations, at least one of the upper frame, the lower frame, or one or both of the side frames can define a contraction prevention groove that extends in a longitudinal direction thereof.

In some implementations, the transparent panel assembly can be applied to the door for a refrigerator, and the door frame supporting the panel assembly can include synthetic resin components that are engageably assembled to each other. Therefore, in comparison to the metal door frame, the total weight of the door is reduced, so that weight lightening of the door assembly can be realized.

In some implementations, the frames (side frames, upper frame, and lower frame) constituting the door frame can be engageably assembled with each other without a fastening device such as a screw, and the door liner assembled in rear of the door frame can be also assembled to the door frame by the locking structure. Therefore, the assembly process of the door can be simplified and the assembling property can be improved.

In some implementations, the panel assembly is supported only by the door frame without adding a separate outer frame other than the door frame, so that the supporting structure of the door can be thinned. An area (see-through part) through which the inside of the refrigerator is visible through the panel unit can be secured relatively wide. Therefore, even when the door is not opened, the user can see the storage space in the refrigerator and aesthetics of the door can be improved.

In some implementations, the front panel providing a frontmost surface in the multi-layered glass panel unit can be configured such that edges thereof are not surrounded by the door frame, and an entire front surface thereof is exposed forward. Therefore, only a glass part (front panel) is exposed at the front of the door, and the aesthetic of the refrigerator can be improved.

In some implementations, when the frames (side frames, upper frame, and lower frame) constituting the door frame are assembled to each other, the front surface of the door frame can be formed in a continuous surface. Therefore, an adhesive force between the panel assembly attached to the front surface of the door frame and the front surface of the door frame can be improved, and the durability of the door can be improved. The wide attachment area can improve sealing performance of the foaming space can be improved.

In some implementations, the rear surface of the door frame is formed in a continuous surface so as to secure a wide contact area between the door liner and the door frame, so that sealing performance of the foaming space can be improved.

In some implementations, when the bezel part of the front panel is formed half-transparent, the bezel part can cover the assembly part such as the door frame arranged in rear of the front panel so as to improve the aesthetic of the door. The bezel part can transmit light emitted from a lighting device or a touchable operating device located at a rear surface of the bezel part, so that the bezel part can be used as a part of a display device.

In some implementations, when the side, upper, and lower frames constituting the door frame are made of synthetic resin material by injection molding, a relatively complicated shape of the door frame can be realized in comparison to when the side, upper, and lower frames are made of a metal material. Therefore, an installation structure for installing various electrical components such as a lighting device and a touch button can be implemented to the door frame.

In some implementations, the side, upper, and lower frames constituting the door frame can be engageably assembled in surface-contact with each other at various surfaces. Therefore, the more solid door frame can be provided, and leakage of the foam solution between the components can be reduced or prevented.

DETAILED DESCRIPTION

One or more implementations of a refrigerator will be described with reference to the accompanying drawings. For example, a built-in type refrigerator having a door assembly will be described for an example, but the door assembly of the present disclosure can be applied to various devices having an inside storage space, such as a general refrigerator, a wine refrigerator, a kimchi refrigerator, a beverage storage, a plant cultivation apparatus, and a laundry processing apparatus.

Figure 1:
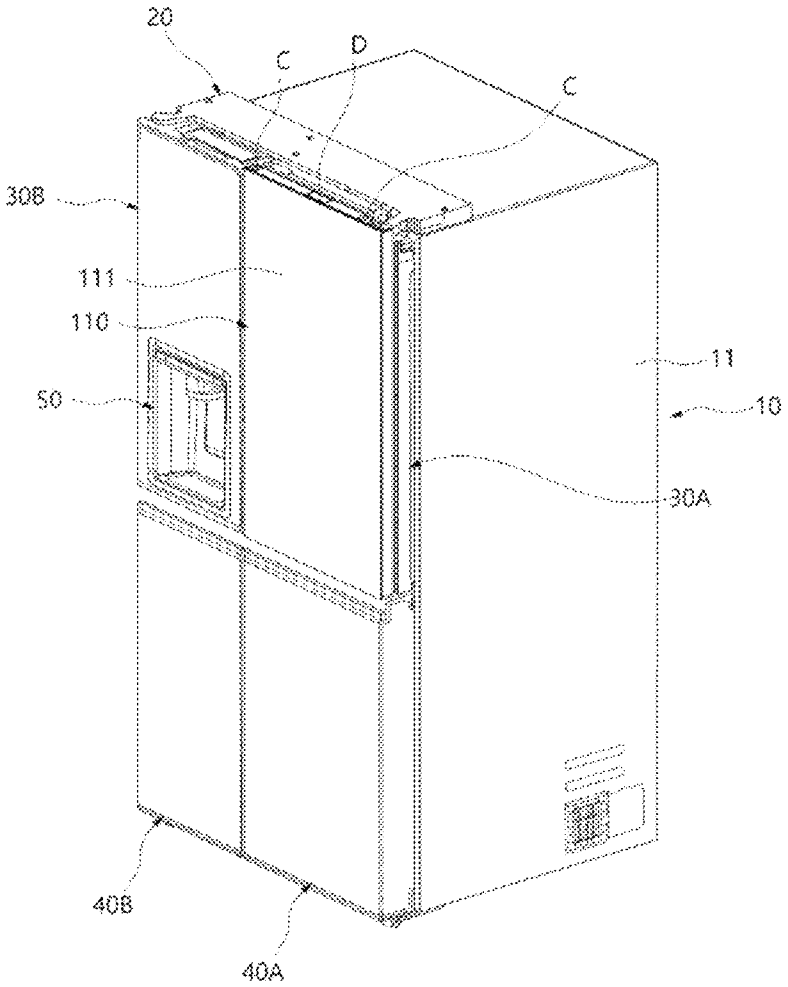
FIG. 1 is a perspective view showing an example of a refrigerator including a door.

In some implementations, as shown in FIG. 1, a cabinet 10 can define the exterior of the refrigerator and have a shape of a six-sided object, for example. The cabinet 10 can define a container that is open forward. The cabinet 10 can include a plurality of parts, and can include an outer casing 11, as a major part, which provides an outside wall surface of the refrigerator. The opening of the cabinet 10 can be shielded by a door, which will be described later.

An upper portion of the cabinet 10 can have an upper plate 20. The upper plate 20 can be connected to the door provided at a front surface of the cabinet 10 to cover a hinge device or constitute a part of the hinge device.

In some implementations, the cabinet 10 can have totally four storage spaces. A first upper storage chamber 30A and a second upper storage chamber 30B can be located at an upper portion in the cabinet 10, and a first lower storage chamber 40A and a second lower storage chamber 40B can be located in a lower portion therein. Each of the four storage spaces can be shielded by each door. In some implementations, a door shielding the first upper storage chamber will be described as an example.

The second upper storage chamber 30B can have a dispenser device 50. A user can take out water or ices by using the dispenser device 50 without opening a door of the refrigerator. The dispenser device 50 can be removed.

Figure 2:
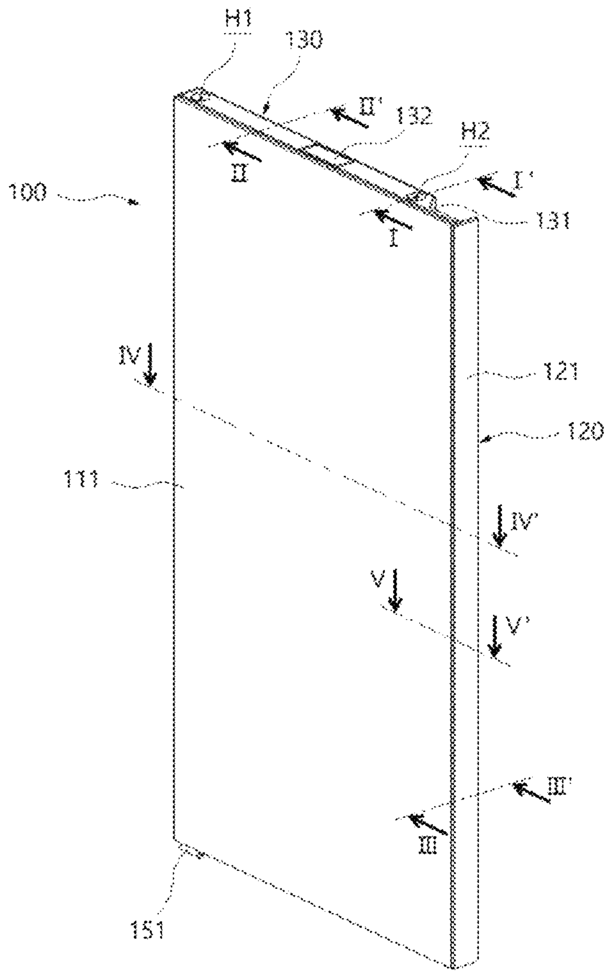
FIG. 2 is a perspective view showing an example of the door.

FIG. 2 is a view showing an example of a door 100 for a refrigerator. As shown in FIG. 2, the door 100 is provided to open and close the first upper storage chamber 30A. In some implementations, the door 100 can be configured to be opened and closed while being rotated. Specifically, the door 100 is brought into close contact with the front surface of the cabinet 10 to close the first upper storage chamber 30A, or moves away from the front frame while being rotated to open the first upper storage chamber 30A.

The refrigerator can achieve the sealed first upper storage chamber 30A by the door 100. The sealed first upper storage chamber 30A can store foods while maintaining a constant temperature without loss of cold air. In some implementations, at least a part of the door 100 is formed in a transparent see-through part 115. Therefore, the first upper storage chamber 30A can be seen from the outside through the see-through part 115.

FIGS. 3 to 19 show a detailed structure of the door 100. In some implementations, a hinge can be mounted at one lateral portion of the door 100. The hinge connects the door 100 to the cabinet 10 such that the door 100 is rotatable. The hinge can be assembled to a door frame, which will be described below. In some implementations, referring to FIG. 2, the hinge is provided at a right surface of the door 100. Contrary to FIG. 2, the hinge can be provided at a left surface of the door 100, and can be provided at a middle height of the door 100, not at upper and lower portions of the door 100. Reference numeral 131 indicates a hinge mounting part to which the hinge is mounted.

Figure 3:
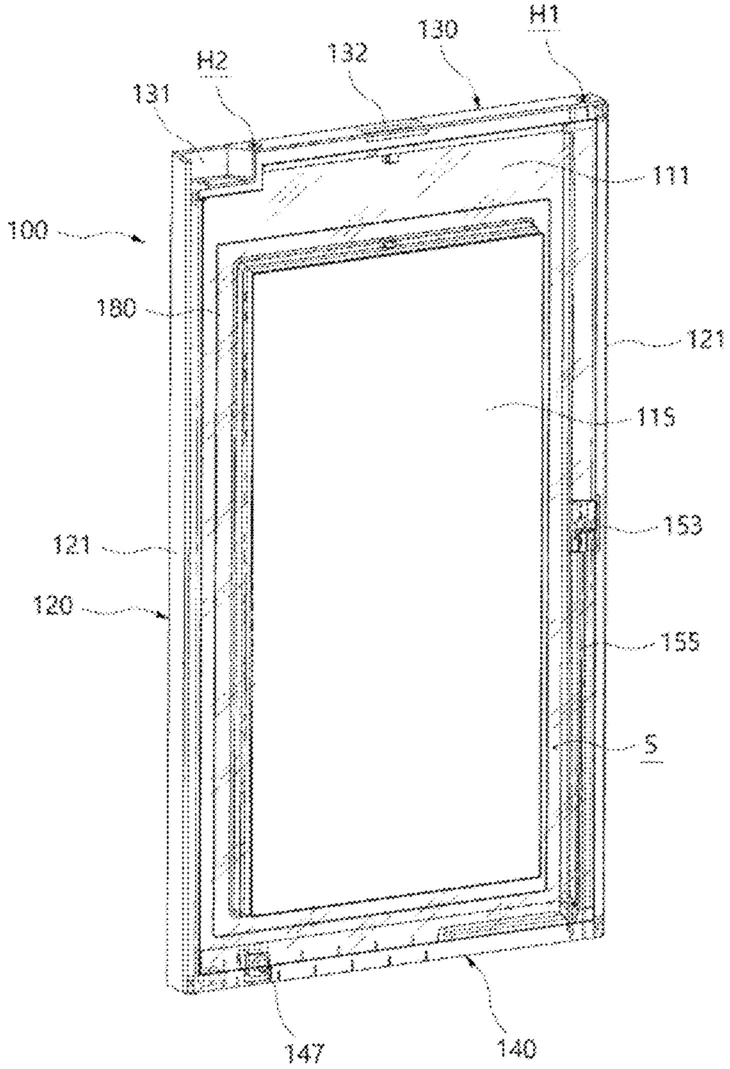
FIG. 3 is a perspective view showing the door at another angle from FIG. 2.

As shown in FIG. 3, a rear portion of the door 100 is shown without a door liner 160 and a gasket 190 that are assembled at the rear portion of the door 100. As shown in the drawing, when the door liner 160 is omitted, an empty-rectangular-shaped foaming space S can be opened at the rear portion of the door 100. The foaming space S can be shielded by the door liner 160 and foaming solution can be injected and foamed through an inlet H1, H2 while the foaming space S being shielded. The foaming space S can be provided in a clearance between the door frame and a rear panel 116 spaced apart from each other, the door frame and the rear panel 116 will be described below.

Figure 4:
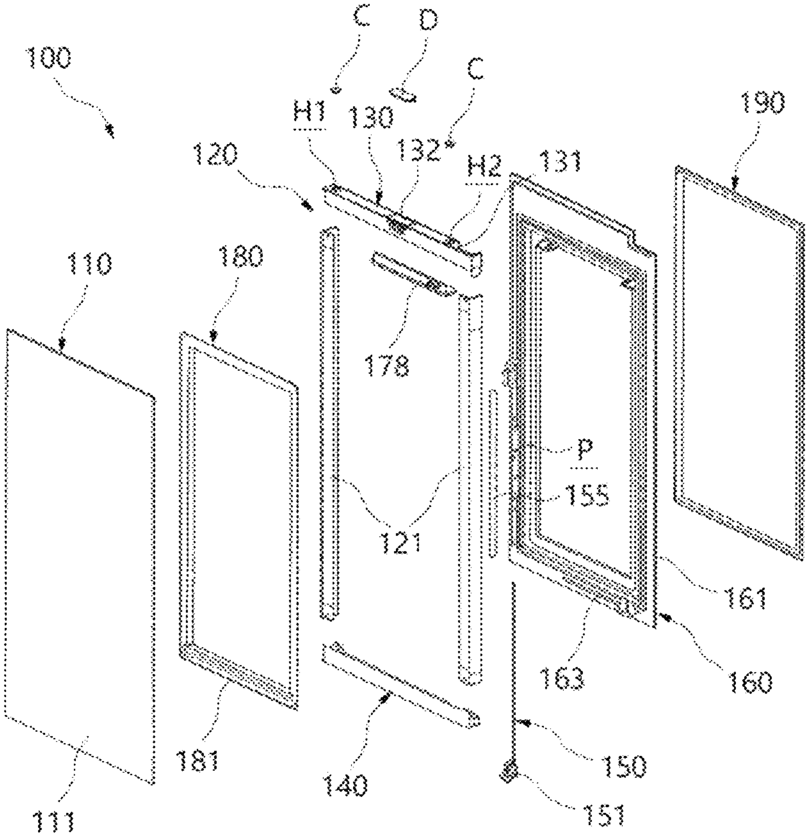
FIG. 4 is a perspective exploded view showing example parts of the door.

FIG. 4 is a perspective exploded view showing disassembled parts constituting the door 100. As shown in FIG. 4, in a direction from the front to the rear of the door 100, a panel assembly 110, a heater housing 180, the door frame, the door liner 160, and the gasket 190 are arranged in order. Among the parts, the heater housing 180 can be arranged between the rear panel 116 of the panel assembly 110 and the door frame.

In some implementations, the panel assembly 110 can include multi-layered glass panels. For example, a plurality of transparent-material panels can be laminated with spaces to provide the panel assembly 110, and the user can selectively see the inside of the refrigerator through the panel assembly 110. In some implementations, the panel assembly 110 is configured such that the plurality of glass panels is arranged while being spaced apart from each other to provide an insulation layer. However, a material is not limited to the glass, and can be made of various materials through which it is possible to see the inside of the refrigerator.

Among the plurality of panel layers, a front panel 111 providing a front surface of the panel assembly 110 can be made of a half glass material to enable the inside of the refrigerator to be selectively seen, or the front panel 111 can be covered with a film to be translucent.

Figure 5:
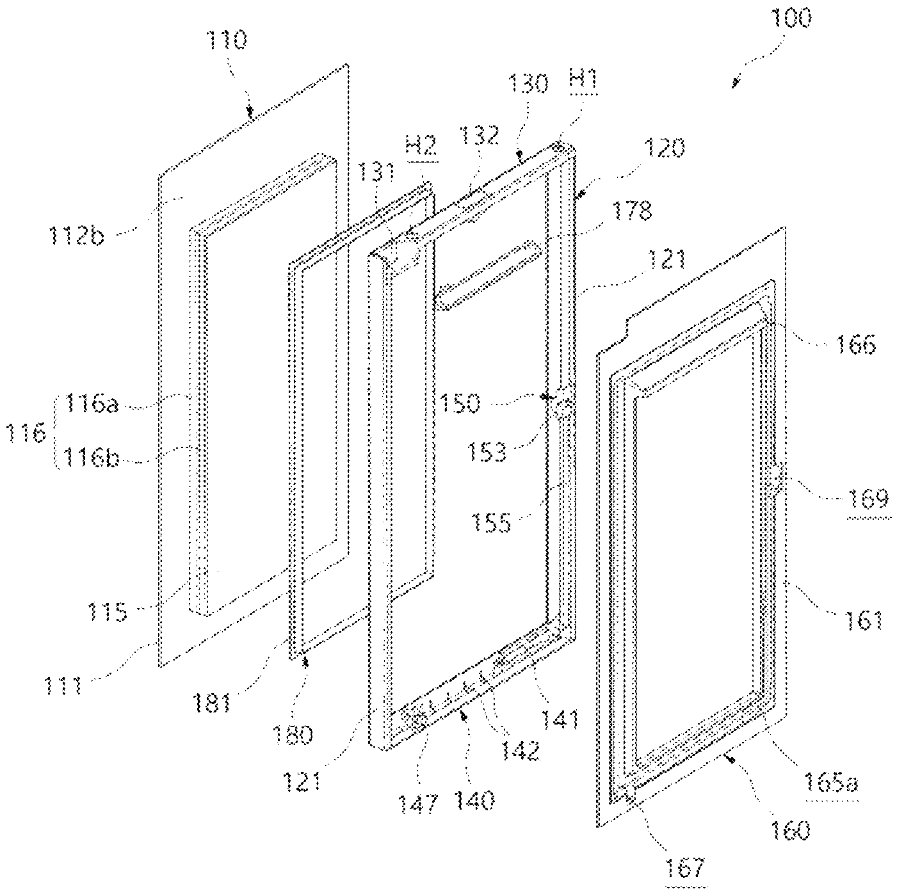
FIG. 5 is a perspective exploded view showing the parts of the door at another angle from FIG. 4.

Referring to FIG. 5, the panel assembly 110 includes the front panel 111 providing the front surface of the panel assembly 110 and the rear panel 116 layered on a rear surface of the front panel 111. The rear panel 116 is layered on a rear portion of the front panel 111. In some implementations, the rear panel 116 can include two layers 116*a* and 116*b*, but can include one layer or less or of three layers or more. The panel assembly 110 can include the front panel 111 and the rear panel 116.

The panel assembly 110 is made of glass or a material that enables the inside of the refrigerator to be visible, so that the user can selectively see the inside of the refrigerator through the panel assembly. The front panel 111 and the rear panel 116 can have an insulation material or an insulation structure to help to prevent leakage of cold air in the refrigerator.

The rear panel 116 can have the size smaller than the size of the front panel 111. Specifically, the area of the front panel 111 can be larger than the area of the rear panel 116. Therefore, an edge of the front panel 111 can protrude more than an edge of the rear panel 116. For example, the edge of the front panel 111 can protrude more than lateral surfaces of the rear panel 116.

The protruding portion of the front panel 111 can be referred to a bezel part 112*b*. A portion in the bezel part 112*b* can be referred to the see-through part 115. The see-through part 115 is a transparent portion as to allow the inside of the storage space to be seen through the panel assembly 110. However, the bezel part 112*b* is not necessarily transparent. In some implementations, the bezel part 112*b* is provided only in the front panel 111. However, the see-through part 115 is provided not only in the front panel 111, and but also in the rear panel 116.

The see-through part 115 is a transparent portion allow the storage space in the refrigerator to be observed through the panel assembly 110, and can be referred to a center portion of the front panel 111 and the entire area of the rear panel 116. Referring to FIG. 3, the see-through part 115 is provided inside the bezel part 112*b*. The door frame, which will be described below, is provided on a rear surface of the bezel part 112*b*, and various parts are located therein. The above structure will be described again below.

Figure 19:
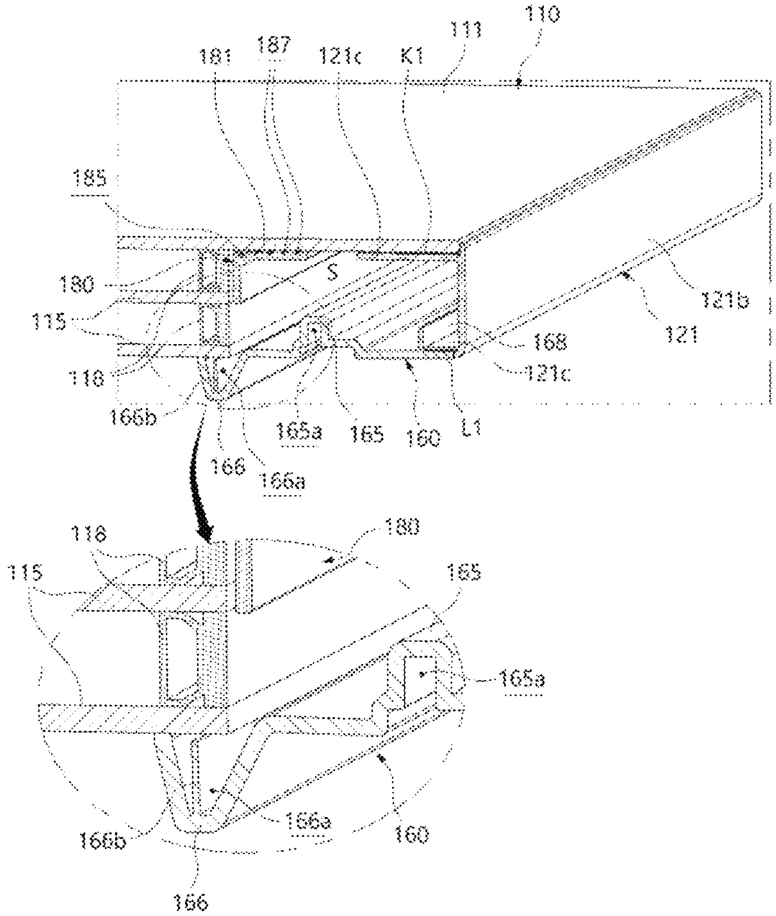
FIG. 19 is a sectional view taken along line V-V' in FIG. 2.

Referring to FIG. 19, a rod 118 can be inserted in a spacing between the glasses constituting the panel assembly 110. The rod 118 is provided to maintain a spacing between the glass panels. The glass panels and a plurality of rods 118 can be attached to each other by an adhesive. A sealant can be coated to maintain the airtightness of the space between the front panel 111 and the rear panel 116.

A low emissivity coating layer can be formed on a rear surface of the rear panel 116 in order to reduce heat transfer into the storage chamber by radiation. A glass on which the low emissivity coating layer is formed is referred to a Low-ε glass. The low emissivity coating layer can be formed by depositing a surface of a glass by sputtering or the like. The space between the front panel 111 and the rear panel 116 sealed by the rod 118 is formed in a vacuum state and thus is insulated.

In some examples, the sealed space between the front panel 111 and the rear panel 116 can be filled with inert gas such as argon gas for insulation. The inert gas is excellent in insulation property compared to normal air.

To describe the door frame, the door frame can be configured such that separate frames are assembled to each other. As the separate frames respectively constituting four sides of the door frame are assembled to be engaged to each other, the door frame is achieved. Among the separate frames, a plurality of inlets H1 and H2 connected to the foaming space S are provided in an upper frame 130 or a lower frame 140. The inlet H1, H2 can be open in a height direction of the door frame. In some implementations, the inlet H1, H2 can be formed in the upper frame 130.

In some implementations, as will be described below, a side frame 120 and the upper frame 130 can be in surface-contact with each other at three surfaces and the side frame 120 and the lower frame 140 can also be in surface-contact with each other at three surfaces. Therefore, a shielding area for sealing the foaming space S can be enlarged.

The door frame can include a pair of side frames 120, the upper frame 130, and the lower frame 140. The side frames 120, the upper frame 130, and the lower frame 140 can be made of a synthetic resin material. The total weight of the door frame can be relatively lightened compared a metal door frame.

Figure 6:
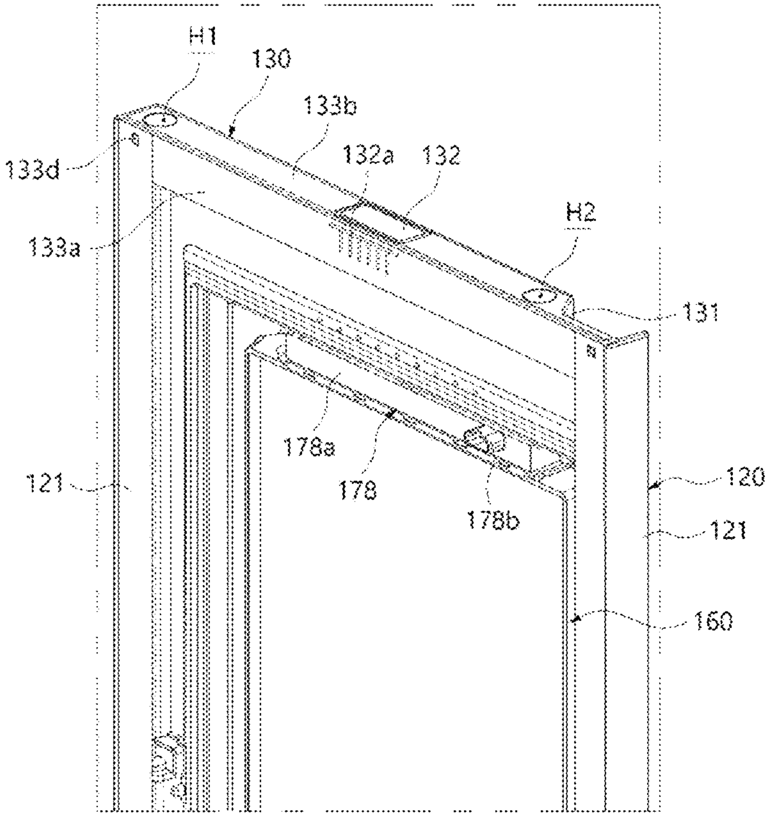
FIG. 6 is a perspective view showing the door without a panel unit.
Figure 7:
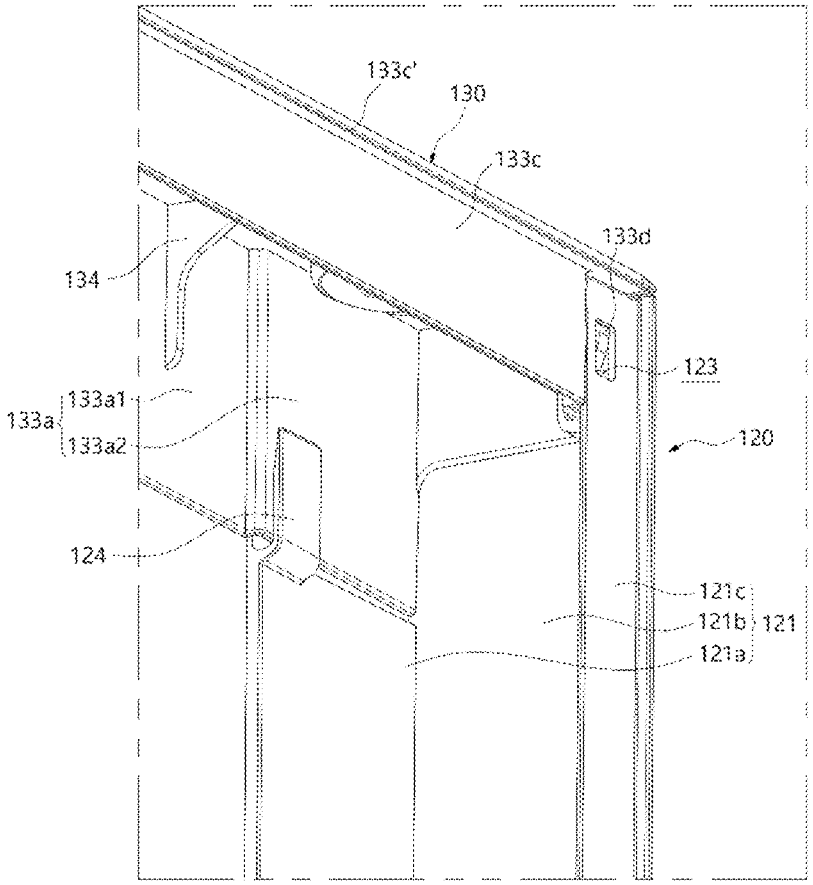
FIG. 7 is a rear-perspective view showing an example of a door frame of the door.

As shown in FIGS. 5 to 7, the side frame 120 can be arranged in a direction in which the side frame stands up on the door frame, that is, in a vertical direction. The side frame 120 can have a U-shape cross-section, and can lengthen in one direction. The above structure can improve the durability of the side frames 120 with respect to distortion or bending.

Specifically, a side body 121 constituting the side frame 120 can include a side front surface 121*a*, a side main portion 121*b*, and a side rear surface 121*c*. The side front surface 121*a*, the side main portion 121*b*, and the side rear surface 121*c* are perpendicularly connected to each other to form the U-shaped cross-section. An upper end and a lower end of the side body 121 can be open in the vertical direction.

The side front surface 121*a* can be in surface-contact with the bezel part 112*b*. The side front surface 121*a* can be formed in a continuous surface with a lower front surface 143*a* and an upper front surface 133*a*, which will be described below. The side front surface 121*a*, the lower front surface 143*a*, and the upper front surface 133*a* can be attached to the bezel part 112*b* by the adhesive to be fixed to each other. The side front surface 121*a*, the lower front surface 143*a*, and the upper front surface 133*a* can form a continuous surface together, whereby an attachment area can be secured sufficiently wide.

The side front surface 121*a* can have a hook arm 124. The hook arm 124 can hold a lower end of the upper frame 130. As shown in FIG. 7, the hook arm 124 can have a cantilever shape extended upward from a rear surface of the side front surface 121*a*. The hook arm 124 can hold the upper frame 130 while supporting the lower end of the upper frame 130.

The side main portion 121*b* can provide a lateral surface of the door frame. The side main portion 121*b* can be in surface-contact with the upper frame 130 and the lower frame 140. As shown in FIG. 7, an upper portion of the side main portion 121*b* overlaps with the upper frame 130.

The side rear surface 121*c* can be perpendicularly connected to the side main portion 121*b* and face the side front surface 121*a*. The side rear surface 121*c* can be narrower than the side front surface 121*a*. In some examples, in order to provide a contact area between the side front surface 121*a* and the panel assembly 110, the side front surface 121*a* can be narrower than the side front surface 121*a*.

The side rear surface 121*c* can have a locking hole 123 into which a first locking hook 133*d* of the upper frame 130 is inserted. The locking hole 123 can be a portion formed by perforating the upper portion of the side rear surface 121*c*. When the first locking hook 133*d* is locked in the locking hole 123, the side frame 120 and the upper frame 130 can be assembled to each other. The hook arm 124 of the side front surface 121*a* and the locking hole 123 of the side rear surface 121*c* are assembled with the upper frame 130, so that the side frame 120 and the upper frame 130 can be restricted from being easily separated from each other and can be secured.

Upper portions of the pair of side frames 120 can be connected to each other by the upper frame 130. The upper frame 130 is formed in a bar shape connecting the pair of side frames 120 to each other, and the upper frame 130 can be arranged in a direction in which the upper frame 130 is placed on the door frame, i.e., in a transverse direction. The upper frame 130 can have a U-shaped cross section as the side frame 120, and can lengthen in one direction. The above structure can improve the durability of the upper frame 130 with respect to distortion or bending.

Specifically, the upper frame 130 can include the upper front surface 133*a*, an upper main part 133*b*, and an upper rear surface 133*c*. The upper front surface 133*a*, the upper main part 133*b*, and the upper rear surface 133*c* can be perpendicularly connected to each other to form a U-shaped cross section. Left and right ends of the upper frame 130 can be open in left and right directions, respectively.

The upper front surface 133*a* can be in surface-contact with the side front surface 121*a*. Referring to FIG. 7, the upper front surface 133*a* overlaps with the side front surface 121*a*. The upper front surface 133*a* can include a first front surface 133*a*1 and a second front surface 133*a*2. The second front surface 133*a*2 can define an assembly surface 133*a*2 that is stepped from the first front surface 133*a*1. The stepped assembly surface 133*a*2 can be a portion stepped rearward from the upper front surface 133*a*, and the rearward stepped portion can be filled with the side front surface 121*a* of the side frame 120. Therefore, the upper front surface 133*a* of the upper frame 130 and the side front surface 121*a* of the side frame 120 can form a continuous surface together.

Figure 9:
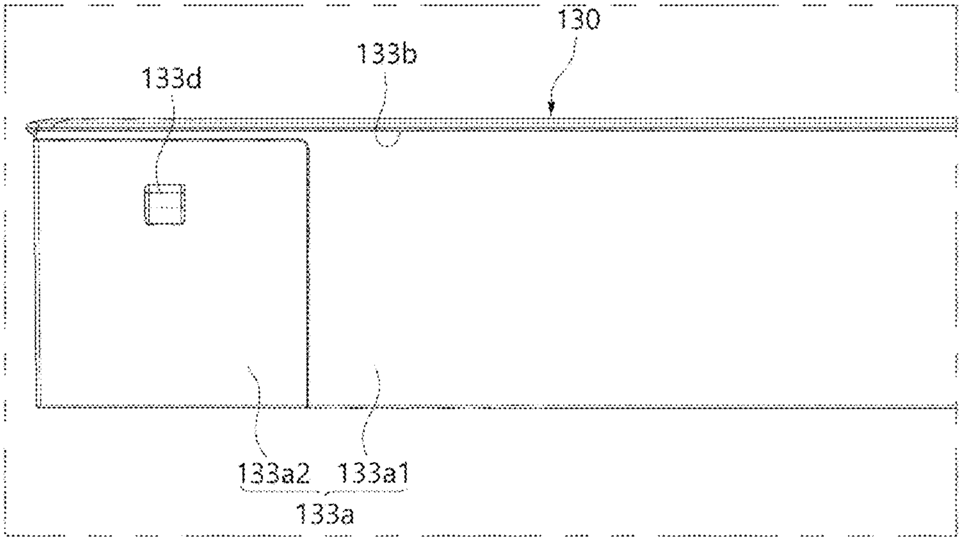
FIG. 9 is a front view showing a front structure of the upper frame of the door.

As shown in FIGS. 6 and 9, the first locking hook 133*d* can be projected on the upper front surface 133*a*. The first locking hook 133*d* can be inserted into the locking hole 123 of the side frame 120. The first locking hook 133*d* can be formed to be inclined downward in an assembly direction of the upper frame 130 and the side frame 120. Therefore, when the upper frame 130 is assembled to the side frame 120, the first locking hook 133*d* can be easily inserted into the locking hole 123. In some implementations, the first locking hook 133*d* can be projected on the stepped assembly surface 133*a*2.

The upper front surface 133*a* can be in surface-contact with the bezel part 112*b*. The upper front surface 133*a* and the rear surface of the bezel part 112*b* can be attached to each other by an adhesive and an adhesive tape. In order to achieve the above structure, the upper front surface 133*a* needs to have a sufficiently wide area.

The upper front surface 133*a* can be connected to the upper main part 133*b*. The upper main part 133*b* can be perpendicularly connected to the upper front surface 133*a* and provide an upper surface of the door frame. As shown in FIG. 5, the upper main part 133*b* can have a hole, the hole can be the inlet H1, H2. The inlet H1, H2 can include two inlets spaced apart from each other in the upper main part 133*b*. The inlet H1, H2 can be open in the height direction of the door frame, i.e., in a vertical direction.

In some implementations, any one of the pair of inlets H1 and H2 can be arranged to overlap with the side frame 120 and another inlet can be arranged at a location deviating from the side frames 120. The above structure is provided to correspond to a flow speed of foam solution injected through the pair of inlets H1 and H2. For example, since the foam solution passing through a locking device 150, which will be described below, is delayed in progress, the inlets H1 and H2 are arranged at the location wherein the side frame 120 and thus increase the flow speed of the foam solution.

Figure 10:
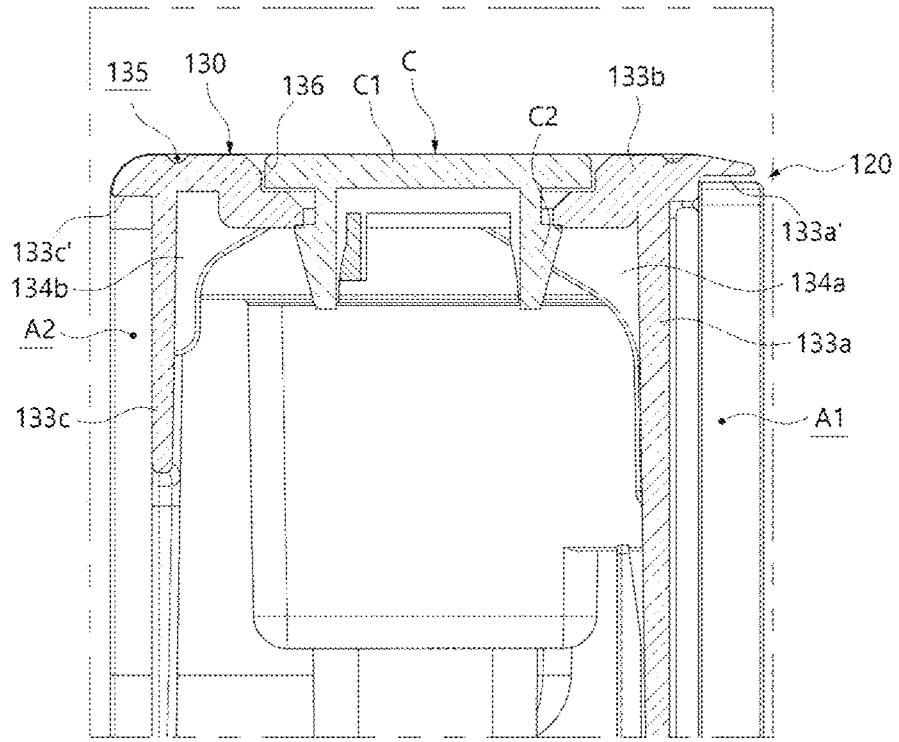
FIG. 10 is a sectional view taken along line I-I' in FIG. 2.

As shown in FIG. 10, a shield cover C covers the inlets H1 and H2. The shield cover C can serve to shield the inlets H1 and H2 after the foam solution is all filled. A cover body C1 of a shield cover C can cover the inlets H1 and H2, and cover hooks C2 can be provided on a lower portion of the cover body C1. The cover body C1 can be seated on a stepped surface 136 formed in the upper main part 133*b*, and the cover hooks C2 can be held by lower surfaces of the inlets H1 and H2.

The upper main part 133*b* can have a contraction prevention groove 135. The contraction prevention groove 135 can be continuously depressed in a longitudinal direction of the upper main part 133*b*. The contraction prevention groove 135 is provided to prevent contraction and deformation in a manufacturing process of the upper frame 130 made by injection of synthetic resin material. The contraction prevention groove 135 can be formed on any one surface of the side frame 120, the upper frame 130, and the lower frame 140.

A predetermined space can be formed between the upper main part 133*b* and the upper front surface 133*a*. As shown in FIG. 10, a first front protruding end 133*a*', which is an end of the upper main part 133*b*, protrudes more than the upper front surface 133*a*, so that a first mounting space A1 can be located below the first front protruding end 133*a*' of the upper main part 133*b*. The first mounting space A1 can be filled with at least part of the front panel 111 of the panel assembly 110.

The upper main part 133*b* can be connected to the upper rear surface 133*c*. The upper rear surface 133*c* can be perpendicularly connected to the upper main part 133*b* and can face the upper front surface 133*a*. As shown in FIG. 7, the upper rear surface 133*c* can be in surface-contact with the side rear surface 121*c*. The upper rear surface 133*c* can also have the first locking hook 133*d*.

In some implementations, the first locking hook 133*d* is provided on a front surface of the upper front surface 133*a*, and the hook arm 124 of the side frame 120 can be locked to a rear surface of the upper front surface 133*a*. Furthermore, the first locking hook 133*d* can be provided on a rear surface of the upper rear surface 133*c*, and the hook arm 124 of the side frame 120 can be hooked by a front surface of the upper rear surface 133*c*. Therefore, the upper frame 130 and the side frame 120 are engaged with each other at various portions thereof, so that firm fixation between the upper frame 130 and the side frame 120 can be achieved.

As shown in FIG. 10, a first rear surface protruding end 133*c*' can be provided on an upper end of the upper main part 133*b*. The first rear surface protruding end 133*c*' is a portion protruding more than the upper rear surface 133*c*, and an empty second mounting space A2 can be provided between the first rear surface protruding end 133*c*' and the upper rear surface 133*c*. The second mounting space A2 can be filled with the door liner 160.

Figure 8:
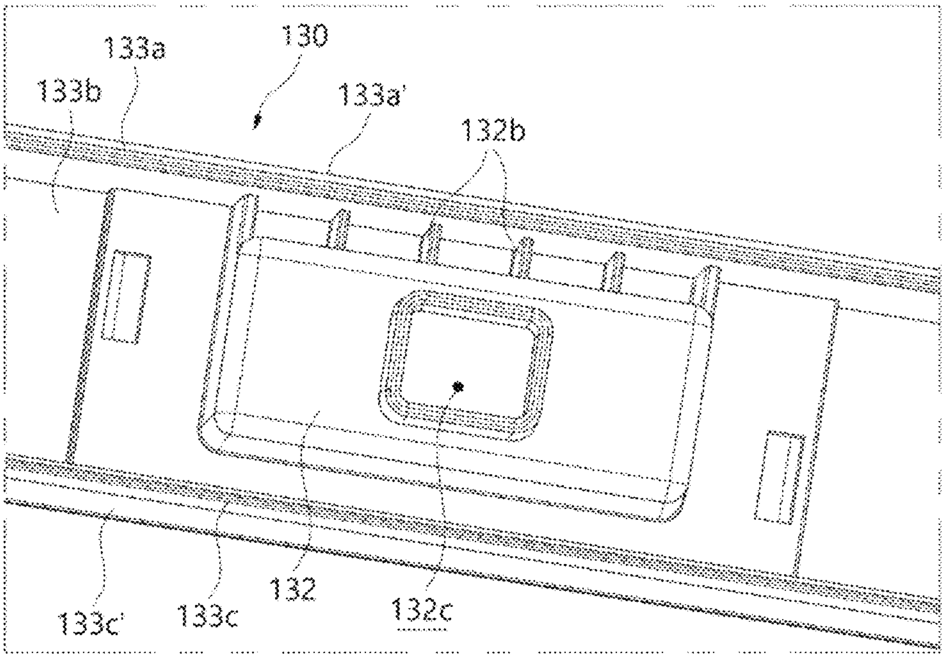
FIG. 8 is a perspective view showing an inside structure of an example of an upper frame of the door.

As shown in FIG. 8, the upper frame 130 can have a sensor mounting part 132. The sensor mounting part 132 can be a portion to which a door sensor is installed. In some implementations, the sensor mounting part 132 can be provided in the upper main part 133*b*, and the sensor mounting part 132 can be depressed on the upper main part 133*b*. FIG. 8 is a perspective view showing a lower portion of the upper main part 133*b*, and referring to FIG. 8, the sensor mounting part 132 can be projected downward. A sensing hole 132*c* can be provided on a center portion of the sensor mounting part 132, and at least of part of the door sensor can be exposed outward.

Referring to FIG. 6, a sensing part 132*a* can be exposed from a front surface of the sensor mounting part 132. The sensing part 132*a* can be arranged in rear of the bezel part 112*b* of the panel assembly 110. In some implementations, the sensor mounting part 132 can be located on a center portion of an upper end of the door 100. As an example, D in FIG. 4 refers to a sensor cover covering the sensor mounting part 132.

Referring to FIG. 8, the sensor mounting part 132 can have transfer ribs 132*b*. The transfer ribs 132*b* can be a structure protruding from a lower surface of the upper main part 133*b*. In some implementations, the transfer ribs 132*b* can be provided such that a plurality of transfer ribs 132*b* is spaced apart from each other. The transfer ribs 132*b* can connect the upper front surface 133*a* on which the sensing part 132*a* is exposed to the sensor mounting part 132. The transfer ribs 132*b* can efficiently transfer an impact generated on a front surface of the door 100 to the sensor mounting part 132.

As shown in FIGS. 7 and 9, surfaces in the upper front surface 133*a*, the upper main part 133*b*, and the upper rear surface 133*c*, the inner surfaces facing the foaming space S, can be connected to each other by a first reinforcement rib 134. A plurality of first reinforcement ribs 134 can be arranged on the upper frame 130 with intervals. The reinforcement rib can help to reduce or prevent twisting or bending of the upper frame 130. Particularly, in the foam process of the foam solution, the reinforcement rib can help to reduce or prevent the deformation of the upper frame 130. In some implementations, since the upper front surface 133*a* is wider than the upper rear surface 133*c*, the reinforcement rib can have an asymmetrical structure. Among the first reinforcement ribs 134, a portion 134*a* connected to the upper front surface 133*a* can be wider than a portion 134*b* connected to the upper rear surface 133*c*.

To describe the lower frame 140, lower portions of the pair of side frames 120 can be connected to each other by the lower frame 140. The lower frame 140 is formed in a kind of bar connecting the pair of side frames 120 to each other. The lower frame 140 can be arranged in a direction in which the lower frame 140 is placed on the door frame, i.e., in the transverse direction. The lower frame 140 can have a U-shaped cross section as the side frame 120, and can lengthen in one direction. The above structure can improve the durability of the lower frame 140 with respect to distortion or bending.

Specifically, the lower frame 140 can include the lower front surface 143*a*, the lower main part 143*b*, and a lower rear surface 143*c*. The lower front surface 143*a*, the lower main part 143*b*, and the lower rear surface 143*c* can be perpendicularly connected to each other to form a U-shape cross section. Left and right ends of the lower frame 140 can be open in left and right directions, respectively.

The lower front surface 143*a* can provide a front surface of the door frame together with the side front surface 121*a* and the upper front surface 133*a*. The lower front surface 143*a* can form a continuous surface together with the side front surface 121*a* and the upper front surface 133*a*, and the continuous surface can be in surface-contact with the bezel part 112*b*.

Figure 11:
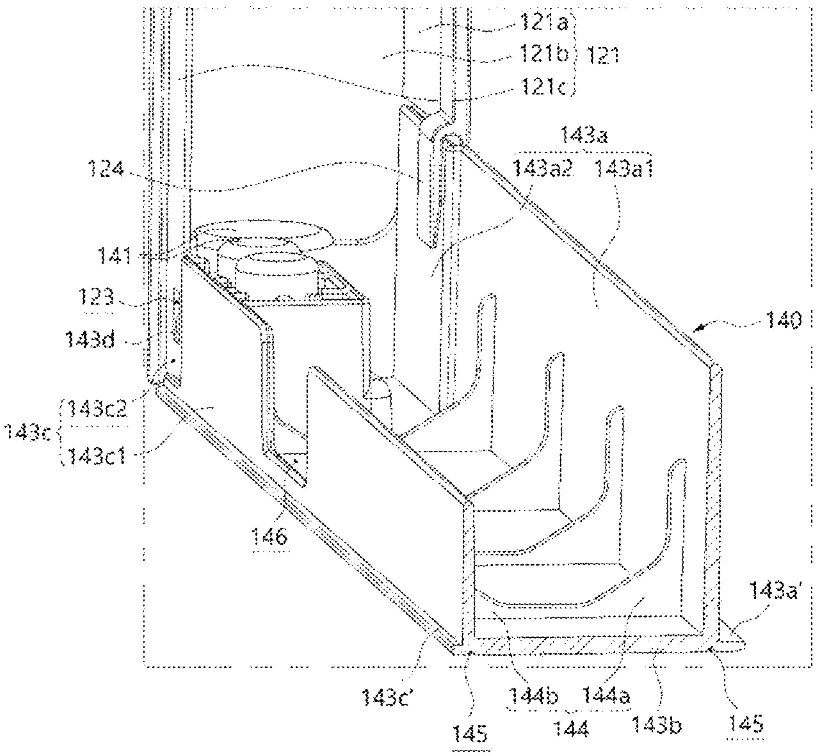
FIG. 11 is a perspective view showing an example of side frames and a lower frame of the door frame of the door.

As shown in FIG. 11, the lower front surface 143*a* can be wider than the lower rear surface 143*c*. The hook arm 124 of the side frames 120 can be hooked by on an upper end of the lower front surface 143*a*. A second locking hook 143*d* can be projected on the lower front surface 143*a*, and the locking hole 123 of the side frame 120 can be fastened by second locking hook 143*d*. In some implementations, an assembly structure between the lower frame 140 and the side frame 120 can be the same as the assembly structure between the upper frame 130 and the side frames 120.

In some implementations, the second locking hook 143*d* is provided on a front surface of the lower front surface 143*a*, and the hook arm 124 of the side frame 120 can be hooked to a rear surface of the lower front surface 143*a*. Furthermore, the second locking hook 143*d* can be provided on a rear surface of the lower rear surface 143*c*, and the hook arm 124 of the side frame 120 can be hooked by a front surface of the lower rear surface 143*c*. Therefore, the upper frame 130 and the side frame 120 are engaged with each other at various portions thereof, so that firm fixation between the upper frame 130 and the side frame 120 can be achieved.

The lower front surface 143*a* can be in surface-contact with the side front surface 121*a*. The lower front surface 143*a* can include a first front surface 143*a*1 and a second front surface 143*a*2. The second front surface 143*a*2 can define an assembly surface 143*a*2 stepped from the first front surface 143*a*1. The assembly surface 143*a*2 is a portion stepped rearward from the lower front surface 143*a*, and the rearward stepped portion can be filled with the side front surface 121*a* of the side frame 120. Therefore, the lower front surface 143*a* of the lower frame 140 and the side front surface 121*a* of the side frame 120 can form a continuous surface.

A predetermined space can be formed between the lower main part 143*b* and the lower front surface 143*a*. As shown in FIG. 11, a second front protruding end 143*a*', which is an end of a lower main part 143*b*, protrudes more than the lower front surface 143*a*, so that the first mounting space A1 can be located above the second front protruding end 143*a*' of the lower main part 143*b*. The first mounting space A1 can be the same as the first mounting space A1 provided between the upper main part 133*b* and the upper front surface 133*a*.

The lower front surface 143*a* can be connected to the lower main part 143*b*. The lower main part 143*b* can provide a bottom surface of the door frame. The lower main part 143*b* can have a hinge housing 141 to which a hinge device can be mounted. The hinge housing can be projected toward the inside of the foaming space S.

The lower main part 143*b* can be connected to the lower rear surface 143*c*. The lower rear surface 143*c* can be perpendicularly connected to the lower main part 143*b* and can face the lower front surface 143*a*. The lower rear surface 143*c* can be in surface-contact with the side rear surface 121*c*.

The lower rear surface 143*c* can include a first rear surface 143*c*1 and a second rear surface 143*c*2 as the lower front surface 143*a*. The second rear surface 143*c*2 and the first rear surface 143*c*1 can define a stepped assembly surface 143*c*2. The assembly surface 143*c*2 is a portion stepped rearward from the lower rear surface 143*c*, and the rearward stepped surface can be filled with the side rear surface 121*c* of the side frame 120. Therefore, the lower rear surface 143*c* of the lower frame 140 and the side rear surface 121*c* of the side frames 120 can form a continuous surface.

A second rear surface protruding end 143*c*' can be provided at a lower end of the lower rear surface 143*c*. The second rear surface protruding end 143*c*' can be a portion protruding from the lower rear surface 143*c*. The empty second mounting space A2 can be provided between the second rear surface protruding end 143*c*' and the lower rear surface 143*c*. The second mounting space A2 can communicate with the second mounting space A2 provided between the upper rear surface 133*c* and the upper main part 133*b*. The second mounting space A2 can be filled with the door liner 160.

Surfaces in the lower front surface 143*a*, the lower main part 143*b*, and the lower rear surface 143*c*, the inner surfaces facing the foaming space S, can be connected to each other by the second reinforcement rib 144. A plurality of second reinforcement rib 144 can be arranged on the lower frame 140 with intervals. The second reinforcement rib 144 can help to prevent twisting or bending of the lower frame 140. Particularly, in the foaming processing of the foam solution, it can be possible to reduce or prevent deformation of the lower frame 140 by the second reinforcement rib 144. In some implementations, since the lower front surface 143*a* is wider than the lower rear surface 143*c*, the second reinforcement rib 144 can have an asymmetrical structure. Among the second reinforcement ribs 144, a portion 144*a* connected to the lower front surface 143*a* can be wider than a portion 144*b* connected to the lower rear surface 143*c*.

Figure 17:
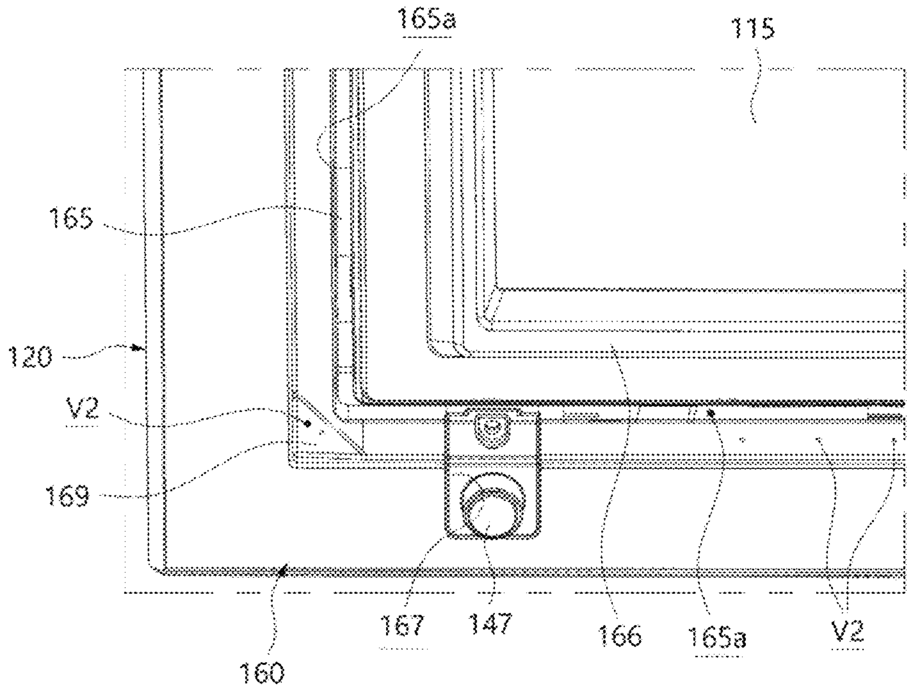
FIG. 17 is a rear-perspective view showing the lower structure of the door.

A push hole 146 can be formed in the lower rear surface 143*c*. The push hole 146 is a portion to which a push device 147 is mounted. A part of the push device 147 can be projected rearward through the push hole 146. FIG. 17 is a view showing a part of the push device 147. The push device 147 can provide an elastic force in a direction in which the door 100 is pushed from the cabinet 10. When the user releases the locking device 150, the door 100 can rotate forward to some degree.

The lower main part 143*b* can have a contraction prevention groove 145. The contraction prevention groove 145 can be continuously depressed in a longitudinal direction of the lower main part 143*b*. The contraction prevention groove 145 can help to prevent contraction and deformation in a manufacturing process of the lower frame 140 made by injection of synthetic resin material.

The front surface of the door frame assembled as described above can provide an attachment surface with respect to the rear surface of the front panel 111 of the panel assembly 110. Specifically, (i) the side front surface 121*a* of the side frame 120 can provide a first attachment surface K1 (referring to FIGS. 16 and 19) with respect to the rear surface of the front panel 111, (ii) the upper front surface 133*a* of the upper frame 130 can provide a second attachment surface K2 (referring to FIGS. 12 and 15) with respect to the rear surface of the front panel 111, and (iii) the lower front surface 143*a* of the lower frame 140 can provide a third attachment surface K3 (referring to FIG. 18) with respect to the rear surface of the front panel 111. The first to third attachment surfaces K1 to K3 are formed in a continuous surface. Therefore, a sufficiently wide attachment area can be secured between the front surface of the door frame and the rear surface of the front panel 111.

The door frame can have the locking device 150. The locking device 150 can be provided to restrict the door 100 from arbitrarily opening. The locking device 150 can be arranged in a vertical direction along the side frame 120. Referring to FIGS. 4 and 5, the locking device 150 can include a handle 151 at a lower end thereof. The locking device 150 with a long bar shape can extend upward from the handle 151. The locking device 150 can be covered by a locking housing 155. Therefore, the locking device 150 can be protected in the foaming process.

A locking part 153 can be provided at a surface opposite to the handle 151. The locking part 153 can be a kind of hook structure. When the user raises the handle 151, the locking part 153 is operated in conjunction with the handle, and a locking state can be released. An elastic member provided in the locking device 150 can recover the handle 151 to the initial location of the handle 151.

The door frame can be coupled to the door liner 160. The door liner 160 can be assembled to the door frame to shield the foaming space S. Specifically, the foaming space S can refer to an empty space defined by the rear surface of the bezel part 112*b*, an inside surface of the door frame, a lateral surface of the rear panel 116, and a front surface of the door liner 160.

When the door liner 160 is assembled to the door frame to shield the foaming space S and the foam solution is injected through the inlets H1 and H2, the foam solution is filled and foamed in the foaming space S to form the insulator.

As shown in FIG. 5, a liner body 161 of the door liner 160 has a rectangular frame shape, and a center portion of the liner body 161 can be void. As the door liner 160 has a frame shape, the storage space in the cabinet 10 can be exposed to the outside while been seen through the see-through part 115 and the door liner 160.

Figure 12:
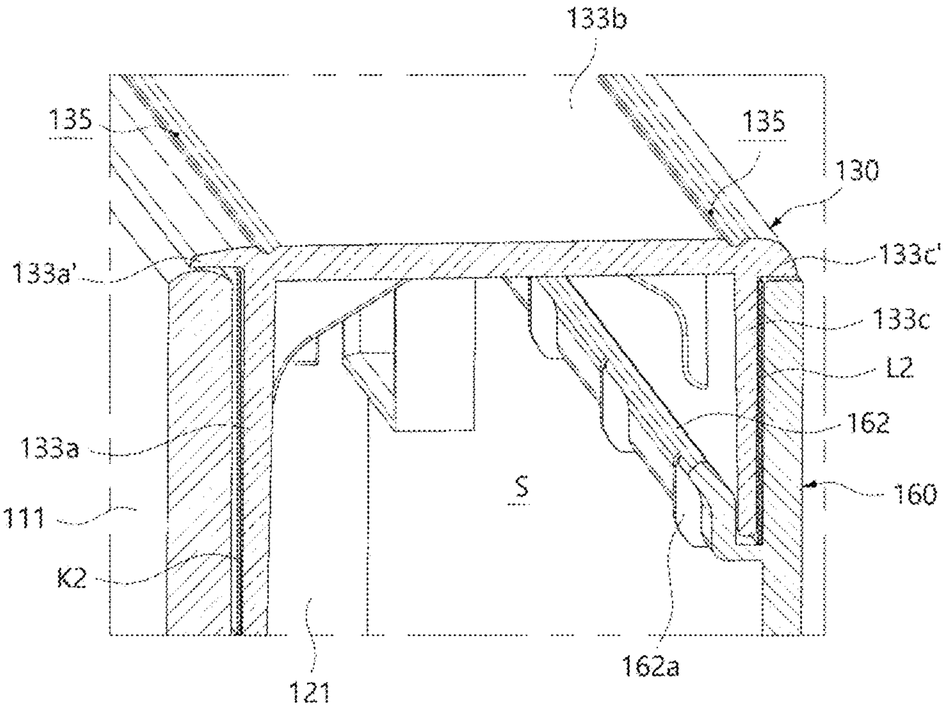
FIG. 12 is a sectional view taken along line II-II' in FIG. 2.

The door liner 160 can be assembled to the door frame. As shown in FIG. 12, the door liner 160 can have a locking arm 162 projected thereon. The locking arm 162 can be extended on the front surface of the door liner 160 while having a cantilever shape. The locking arm 162 can be extended to be inclined toward the upper side, i.e., toward the upper frame 130. The locking arm 162 can be locked by a lower end of the upper rear surface 133*c* of the upper frame 130. The locking arm 162 can have a plurality of locking pieces 162*a* to increase the elastic force of the locking arm 162.

Figure 13:
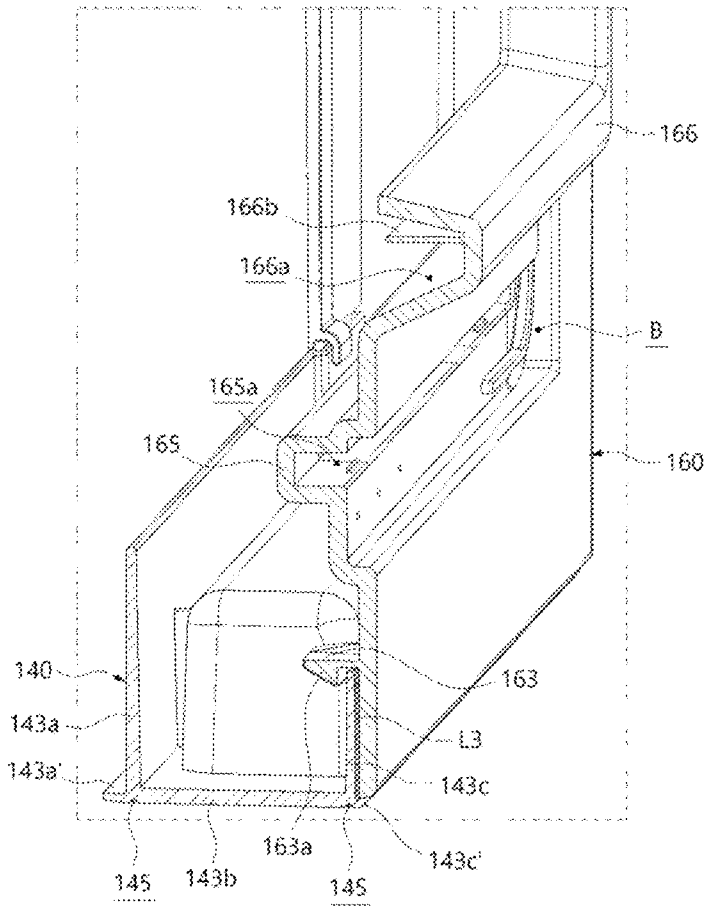
FIG. 13 is a sectional view taken along line III-III' in FIG. 2.
Figure 14:
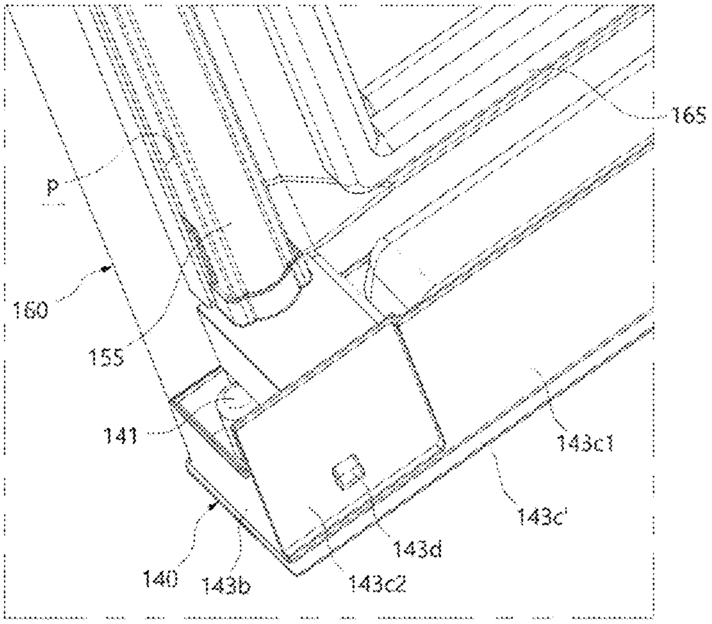
FIG. 14 is a perspective view showing an example of a lower structure of the door without the panel unit and the side frames.

As shown in FIG. 13, the door liner 160 can have a locking hook 163 at a lower portion thereof. The locking hook 163 can be projected from the front surface of the door liner 160 while having a cantilever shape. The locking hook 163 can be assembled while passing through the lower rear surface 143*c* of the lower frame 140. A locking step 163*a* can be provided at an end of the locking hook 163 to maintain a locking state of the locking hook 163.

As described above, an upper portion of the door liner 160 can be locked to the upper frame 130 by the locking arm 162. A lower portion of the door liner 160 can be locked to the lower frame 140 by the locking hook 163. The worker firstly locks the locking arm 162 to the upper frame 130 and then rotates the lower end of the door liner 160 to lock the locking hook 163 to the lower frame 140. Accordingly, the door liner 160 and the door frame can be simply assembled to each other.

Figure 15:
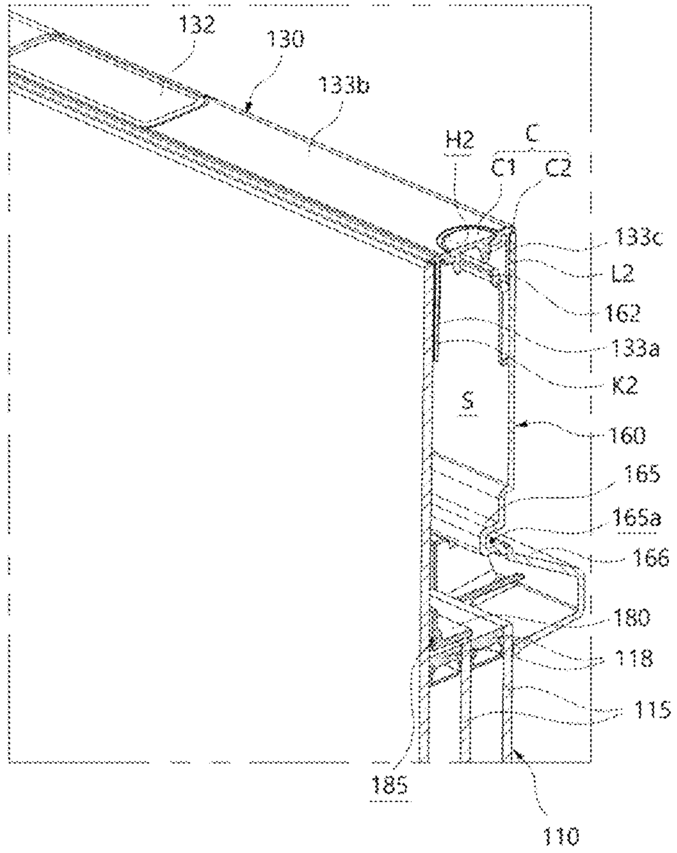
FIG. 15 is a sectional view showing an example of an upper lateral structure of the door.
Figure 16:
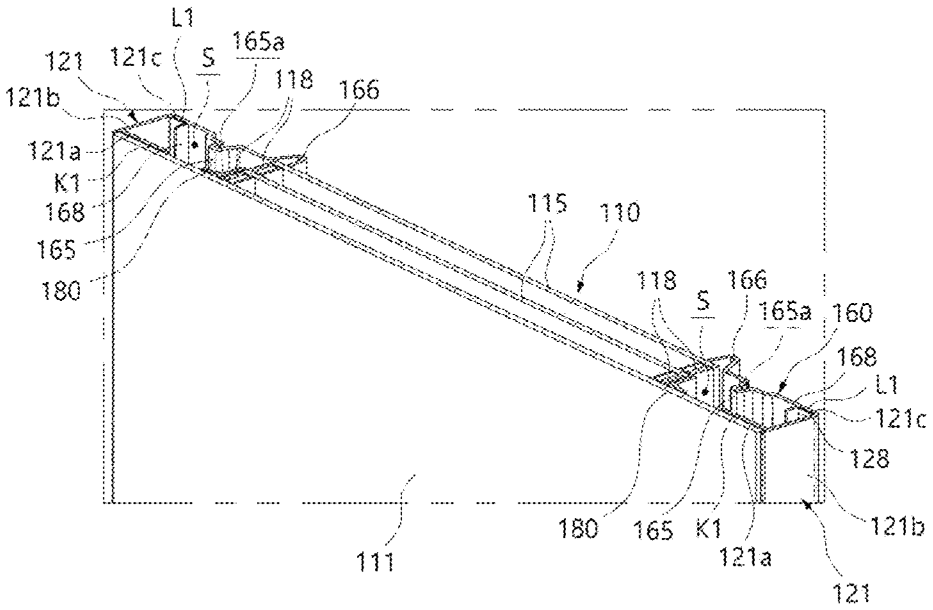
FIG. 16 is a sectional view taken along line IV-IV' in FIG. 2.

When the door liner 160 is assembled to the door frame, the door liner 160 can be in surface-contact with the side frame 120, the upper frame 130, and the lower frame 140 constituting the door frame. As shown in FIG. 16, the door liner 160 is in surface-contact with the side rear surface 121*c* of the side frames 120 to form a first liner contact surface L1. As shown in FIGS. 12 and 15, the door liner 160 is in surface-contact with the upper rear surface 133*c* of the upper frame 130 to form a second liner contact surface L2. As shown in FIG. 13, the door liner 160 is in surface-contact with the lower rear surface 143*c* of the lower frame 140 to form a third liner contact surface L3. As described above, the door liner 160 is in surface-contact with the side frames 120, the upper frame 130, and the lower frame 140 constituting the door frame, whereby a shielding area for sealing the foaming space S can be wider.

As shown in FIG. 13, the door liner 160 can have the gasket mounting part B. The gasket mounting part B can be formed such that a part of the door liner 160 is recessed, and the gasket 190 can be assembled to the gasket mounting part B. A shape of the gasket mounting part B can be variously changed in response to a shape of the gasket 190.

The gasket mounting part B of the door liner 160 can include a protrusion 165 and the protrusion 165 can include a gasket assembly groove 165*a*. The gasket assembly groove 165*a* can be recessed from the rear surface of the door liner 160 deeper than the gasket mounting part B. A part of the gasket 190 can be inserted into the gasket assembly groove 165*a*. In some examples, a fastening device can be assembled to the gasket assembly groove 165*a*, so that the gasket 190 can be securely fixed to the door liner 160 by a beam.

As shown in FIG. 17, the gasket assembly groove 165*a* can have a plurality of air vents V2 connected to the foaming space S. The air vents V2 can be provided to discharge air in the foaming space S to the outside. The plurality of air vents V2 can be formed along the gasket assembly groove 165*a*. Since the inlets H1 and H2 can include the pair of inlets H1 and H2, the foam solution injected through the pair of inlets H1 and H2 expands and solidifies to cause a gas trap, and the air vents V2 can release the gas trap.

A push passing part 167 to which the push device 147 is mounted can be provided at the lower portion of the door liner 160. A part of the push device 147 is projected rearward through the push passing part 167, so that the push device 147 can be brought into close contact with the front surface of the cabinet 10.

The door liner 160 can have an interference prevention part 169. For example, the interference prevention part 169 can include a recessed space provided to avoid interference with the gasket 190 in a process in which the gasket 190 is depressed. In some implementations, the interference prevention part 169 can be formed at an edge portion of the gasket mounting part B adjacent to the protrusion. The interference prevention part 169 can have air vents V2.

As described above, the door liner 160 can include the first liner contact surface L1, the second liner contact surface L2, and the third liner contact surface L3 between the door liner 160 and the door frame. The door liner 160 can be in contact with the rear surface of the rear panel 116 to form a boundary of the foaming space S. A part outside the door liner 160 can be in close contact with a rear surface edge of the door frame, and a part inside the door liner 160 can be in closed contact with the rear surface of the rear panel 116.

Figure 18:
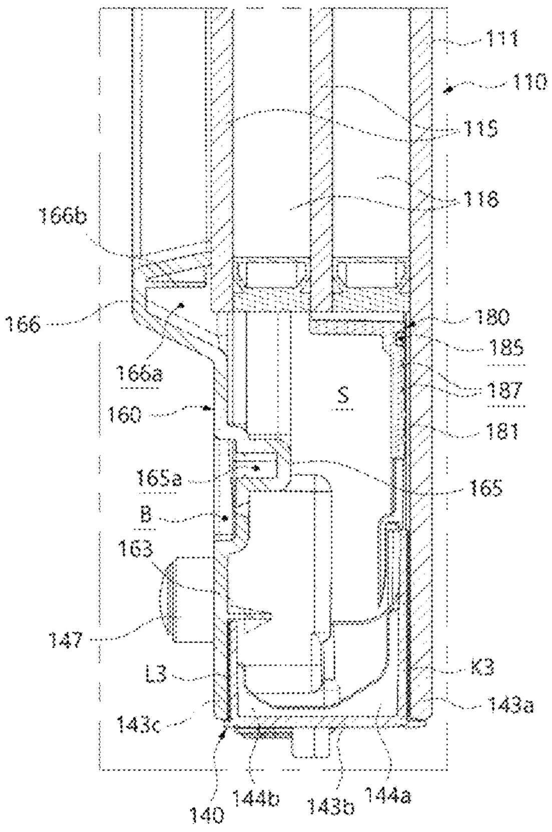
FIG. 18 is a sectional view showing the lower structure of the door.

As shown in FIGS. 13, 18, and 19, a foam boundary portion 166 can be provided inside the door liner 160. The foam boundary portion 166 can be projected toward the rear of the door liner 160, i.e., in a direction away from the rear panel 116. In some implementations, the foam boundary portion 166 can have a triangular cross section. A damping space 166*a* can be provided inside the triangular space.

A one end of the foam boundary portion 166 can be can be in close contact with a surface of the rear panel 116. A portion where the foam boundary portion 166 and the rear panel 116 meet together can be provided as one boundary of the foaming space S. The damping space 166*a* can help to reduce or prevent excessive pressure on the foam boundary portion 166 by slowing a filling speed of the foam solution.

The damping space 166*a* can have a damping plate 166*b* projected toward a surface of the rear panel 116. The damping plate 166*b* can have a plate structure extended along the damping space 166*a*. The damping space 166*a* can be divided into left and right spaces with the damping plate 166*b* as the center. In some examples, one end of the damping plate 166*b* and the surface of the rear panel 116 may not be in close contact with each other, and can be spaced apart from each other at a predetermined interval, as shown in the enlarged view of FIG. 19. Therefore, the foam solution can be filled into the boundary over the damping plate 166*b*. The damping plate 166*b* can slow the filling speed of the foam solution into the damping space 166*a* down.

As shown in FIG. 19, an edge of the door liner 160 can be in surface-contact with the side rear surface 121*c* of the side frames 120. The first liner contact surface L1 described above can be provided on the contact portion. A division fence 168 can be projected on an inner portion of the door liner 160 adjacent to the side rear surface 121*c* toward the side front surface 121*a* of the side frame 120. The division fence 168 can slow a speed of the foam solution flowing toward the first liner contact surface L1 to help to prevent the foam solution from leaking to the outside. The division fence 168 can be extend in the same direction as the damping plate 166*b*.

As shown in FIGS. 4 to 6, the door frame and the rear panel 116 are spaced apart from each other, and a lighting device 178 can be installed in a part of the foaming space S. The lighting device 178 can be provide to light the see-through part 115 and be arranged in the transverse direction. The lighting device 178 can include a lighting part 178*a* such as a LED for emitting light, and a connector part 178*b* applying power and transmitting a signal. The lighting device 178 can be omitted or can be replaced with an input device for signal inputting.

The bezel part 112*b* can be coupled to the heater housing 180. The heater housing 180 is provided to install the heating device such as a heater wire. In some implementations, heater housing 180 can be provided at a boundary portion between the front panel 111 of the heater housing 180 and the rear panel 116. The heating device can help to prevent condensation generated on the door 100. A housing body 181 constituting the heater housing 180 can have a rectangular frame shape.

As shown in FIGS. 18 and 19, the housing body 181 constituting the heater housing 180 can have a heater mounting groove 185 formed toward a rear surface of the bezel part 112*b*. The heating device can be mounted in the heater mounting groove 185. The heater mounting groove 185 can be provided at a location adjacent to the rear panel 116.

The heater housing 180 can have attachment grooves 187 at a location adjacent to the heater mounting groove 185. The attachment grooves 187 can be open toward the bezel part 112*b*. The attachment grooves 187 can be provided to firmly attach the adhesive or adhesive tape, which holds the heater housing 180 to the bezel part 112*b*, to the heater housing 180. In some implementations, the attachment grooves 187 can include a plurality of attachment grooves 187 to form a continuously uneven structure.

Hereinbelow, an example of a process of manufacturing the door will be described. In some implementations, the front panel 111 and the rear panel 116 that constitute the panel assembly 110 can be layered together to constitute the single panel assembly 110. Separately, the door frame can be assembled. The door frame can include the pair of side frames 120, the upper frame 130, and the lower frame 140. The upper frames 130 can be assembled in a downward direction and the lower frame 140 can be assembled in an upward direction. In some implementations, the assembly structure between the side frames 120 and the upper frame 130 and the assembly structure between the side frames 120 and the lower frame 140 can be the same.

In some implementations, the first locking hook 133*d* can be provided at the front surface of the upper front surface 133*a*. The hook arm 124 of the side frame 120 can be locked to the rear surface of the upper front surface 133*a*. Furthermore, the first locking hook 133*d* can be provided on a rear surface of the upper rear surface 133*c*, and the hook arm 124 of the side frame 120 can be hooked by a front surface of the upper rear surface 133*c*. Therefore, the upper frame 130 and the side frame 120 are engaged with each other at various portions thereof, so that firm fixation between the upper frame 130 and the side frame 120 can be achieved.

Figure 20:
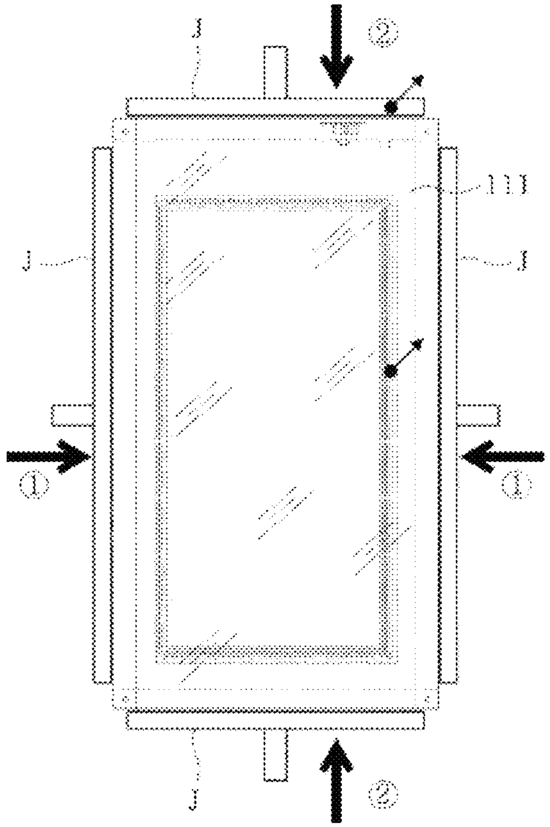
FIG. 20 is a view showing an example of manufacturing the door.

When the door frame is assembled, the door frame and the panel assembly 110 can be coupled to each other. The panel assembly 110 can be laid down with the front panel 111 facing upward, and the door frame can be arranged to surround the rear panel 116. As shown in FIG. 20, jigs J can be provided at four surfaces of the door frame to push the door frame in directions of edges thereof. Arrows ① and ② indicates the directions in which the jigs J push the door frame.

Then, when the front panel 111 is pressed in a downward direction by using a roller, etc., the rear surface of the bezel part 112*b* and the front surface of the door frame can be brought into contact with each other. As described above, (i) the side front surface 121*a* of the side frame 120 can provide the first attachment surface K1 (referring to FIGS. 16 and 19) with respect to the rear surface of the front panel 111, (ii) the upper front surface 133*a* of the upper frame 130 can provide the second attachment surface K2 (referring to FIGS. 12 and 15) with respect to the rear surface of the front panel 111, and (iii) the lower front surface 143*a* of the lower frame 140 can provide the third attachment surface K3 (referring to FIG. 18) with respect to the rear surface of the front panel 111. The first to third attachment surfaces K1 to K3 can be formed in a continuous surface. Therefore, it can be possible to secure sufficiently firm attachment between the front surface of the door frame and the rear surface of the front panel 111.

The assembly including the panel assembly 110 and the door frame can be turned over, and the heater housing 180 can be attached to the bezel part 112*b*. The door liner 160 can be assembled in rear of the door frame. The upper portion of the door liner 160 can be locked to the upper frame 130 by the locking arm 162. The lower portion of the door liner 160 can be locked to the lower frame 140 by the locking hook 163. The worker firstly locks the locking arm 162 to the upper frame 130 and then rotates the lower end of the door liner 160 to lock the locking hook 163 to the lower frame 140.

Then, the door liner 160 can be in surface-contact with the side frame 120, the upper frame 130, and the lower frame 140 constituting the door frame. The door liner 160 can be in surface-contact with the side rear surface 121*c* of the side frame 120 to provide the first liner contact surface L1, the door liner 160 is in surface-contact with the upper rear surface 133*c* of the upper frame 130 to provide the second liner contact surface L2, and the door liner 160 is in surface-contact with the lower rear surface 143*c* of the lower frame 140 to provide the third liner contact surface L3. As described above, the door liner 160 is in surface-contact with the side frames 120, the upper frame 130, and the lower frame 140 constituting the door frame, whereby a shielding area for sealing the foaming space S can be wider.

The foam solution can be filled through the inlets H1 and H2 and foamed to form the insulator. The foam solution can be filled into the foaming space without leakage to the outside by the structure of the surface-contact between the bezel part 112*b* and of the front surface of the door frame and the surface-contact between the rear surface of the door frame and the door liner 160.

Hereinabove, although all components constituting the implementation are described as being coupled to each other or operated in combination as one, the present disclosure is not limited to the implementation. Within the scope of the purpose of the present disclosure, all of the components can be operated by selectively coupling one or more components together.

What is claimed is:

1. A refrigerator comprising:

a cabinet having a storage chamber; and a door configured to open and close at least a portion of the storage chamber, wherein the door comprises:

a panel assembly configured to provide a see-through portion that allows the storage chamber or a rear space of the door to be visible from an outside of the door, the panel assembly comprising (i) a front panel that is made of a glass material and defines a front surface of the door, (ii) a rear panel that is made of a glass material and defines a rear surface of the door, and (iii) a rodr that is disposed between the front panel and the rear panel and defines a sealed space between the front panel and the rear panel, an upper frame that is coupled to the panel assembly and defines an upper surface of the door, a lower frame that is coupled to the panel assembly and defines a lower surface of the door, a side frame that is coupled to the panel assembly and defines a side surface of the door, a door liner that is coupled to the panel assembly and defines a part of the rear surface of the door and a liner opening that has a rectangular shape and faces the rear panel, the door liner comprising a foam boundary portion that protrudes from a periphery of the liner opening and contacts the rear panel, the foam boundary portion defining a damping space, and an insulator provided in (i) a foaming space that is defined by the panel assembly, the upper frame, the lower frame, and the side frame, and (ii) the damping space, wherein at least one of the upper frame or the lower frame defines an inlet configured to receive a foaming solution to thereby provide the insulator to the foaming space and the damping space, and wherein the door liner further comprises a damping plate that is disposed within the damping space and extends toward a rear surface of the rear panel to thereby divide the damping space, the damping plate being configured to slow down a filling speed of the foaming solution in the damping space.

2. The refrigerator of claim 1, wherein the damping space is defined inward relative to the foaming space toward the liner opening and fluidly connected to the foaming space.

3. The refrigerator of claim 1, wherein the damping plate protrudes from an inner surface of the foam boundary portion toward the rear panel.

4. The refrigerator of claim 1, wherein the damping space and the insulator surround the periphery of the liner opening.

5. The refrigerator of claim 1, wherein the upper frame defines the inlet, and the inlet passes through the upper surface of the door.

6. The refrigerator of claim 1, wherein the upper frame defines a plurality of inlets configured to receive the foaming solution, the plurality of inlets including the inlet.

7. The refrigerator of claim 6, wherein the plurality of inlets pass through the upper surface of the door.

8. The refrigerator of claim 1, wherein the door further comprises a cover that covers the inlet.

9. The refrigerator of claim 1, wherein the foam boundary portion protrudes rearward relative to the rear panel, and wherein the damping plate protrudes forward from an inner surface of the foam boundary portion toward the rear panel.

10. The refrigerator of claim 1, wherein the foam boundary portion is disposed at a position corresponding to the rod.

11. The refrigerator of claim 1, wherein the foam boundary portion has (i) a first end that is in contact with the rear panel and (ii) a second end that is spaced apart from the panel assembly and defines a passage between the foaming space and the damping space.

12. The refrigerator of claim 1, wherein the upper frame has:

an upper front surface that extends downward from a front end of the upper frame and is in contact with a rear surface of the front panel; and an upper rear surface that extends downward from a rear end of the upper frame and is in contact with a front surface of the door liner, and wherein at least a portion of the foaming space is defined between the upper front surface and the upper rear surface of the upper frame.

13. The refrigerator of claim 12, wherein the door further comprises a heater housing that is in contact with the rear surface of the front panel and surrounds the see-through portion, and wherein the heater housing is disposed at a position closer to the rod than to the upper frame, the side frame, and the lower frame.

14. The refrigerator of claim 13, wherein the heater housing comprises:

a front portion that extends along the rear surface of the front panel and defines a heater mounting groove recessed away from the rear surface of the front panel; and a rear portion that extends rearward from the front portion along the rod.

15. The refrigerator of claim 12, wherein a contact length of the upper front surface along the rear surface of the front panel is greater than a contact length of the upper rear surface along the front surface of the door liner.

16. The refrigerator of claim 12, wherein the upper frame further comprises a reinforcement rib that extends from an inner side of the upper frame facing the insulator in the foaming space.

17. The refrigerator of claim 1, wherein the lower frame has:

a lower front surface that extends upward from a front end of the lower frame and is in contact with a rear surface of the front panel; and a lower rear surface that extends upward from a rear end of the lower frame and is in contact with a front surface of the door liner, and wherein at least a portion of the foaming space is defined between the lower front surface and the lower rear surface of the lower frame.

18. The refrigerator of claim 17, wherein the door liner comprises a locking hook that protrudes forward from the front surface of the door liner toward the lower front surface and passes through an upper end of the lower rear surface of the lower frame.

19. The refrigerator of claim 17, wherein the lower frame further comprises a reinforcement rib that extends from an inner side of the lower frame facing the insulator in the foaming space.

20. The refrigerator of claim 1, wherein the damping plate partitions the damping space into (i) a first damping space having a first volume and (ii) a second damping space that is laterally outside the first damping space and has a second volume greater than the first volume.

* * * * *